United States Patent
Cooper et al.

(10) Patent No.: US 9,953,401 B2
(45) Date of Patent: *Apr. 24, 2018

(54) APPARATUS AND SYSTEM FOR DETERMINING BLOCK AVERAGES FOR FILM GRAIN SIMULATION

(71) Applicant: THOMSON LICENSING, Issy de Moulineaux (FR)

(72) Inventors: Jeffrey Allen Cooper, Rocky Hill, NJ (US); Joan Llach, Cedex (FR); Cristina Gomila, Cedex (FR)

(73) Assignee: THOMSON Licensing, Issy-les-Moulineaux (FR)

( * ) Notice: Subject to any disclaimer, the term of this patent is extended or adjusted under 35 U.S.C. 154(b) by 131 days.

This patent is subject to a terminal disclaimer.

(21) Appl. No.: 14/659,782

(22) Filed: Mar. 17, 2015

(65) Prior Publication Data
US 2015/0187387 A1 Jul. 2, 2015

Related U.S. Application Data

(63) Continuation of application No. 11/252,320, filed on Oct. 17, 2005, now Pat. No. 9,117,260.
(Continued)

(51) Int. Cl.
*G11B 27/031* (2006.01)
*G06F 17/30* (2006.01)
(Continued)

(52) U.S. Cl.
CPC ........ *G06T 5/002* (2013.01); *G06F 17/30784* (2013.01); *G11B 27/031* (2013.01);
(Continued)

(58) Field of Classification Search
CPC ........... G06T 2207/20204; G06T 5/002; G06T 2207/10016; G06T 2207/20052;
(Continued)

(56) References Cited

U.S. PATENT DOCUMENTS

| 4,191,594 A | 3/1980 | Stark et al. |
| 4,636,845 A | 1/1987 | Alkofer |

(Continued)

FOREIGN PATENT DOCUMENTS

| CN | 1324060 | 11/2001 |
| EP | 0373615 | 6/1990 |

(Continued)

OTHER PUBLICATIONS

Campisi et al., "Signal-Dependent Film Grain Noise Generation using Homomorphic Adaptive Filtering", IEEE Proceedings: Vision, Image and Signal Processing, vol. 147, No. 3, Jun. 23, 2000, pp. 283-287.

(Continued)

*Primary Examiner* — Kim Vu
*Assistant Examiner* — Michael Vanchy, Jr.
(74) *Attorney, Agent, or Firm* — Brian J. Dorini; Robert D. Shedd

(57) ABSTRACT

The present invention provides apparatuses and systems for determining block averages in film grain simulation including determining block averages during a display process and determining block averages during a decoding process. The apparatuses and systems of the present invention exhibit different characteristics in terms of memory requirements and computational cost. More specifically, the first apparatus and system use no external memory, but require either extra reads of the blocks, or internal memory in the display pipeline, while the second apparatus and system require extra memory bandwidth and extra external memory (e.g., RAM).

20 Claims, 5 Drawing Sheets

Related U.S. Application Data

(60) Provisional application No. 60/629,632, filed on Oct. 18, 2004.

(51) Int. Cl.
    *H04N 5/775*     (2006.01)
    *H04N 9/87*     (2006.01)
    *G06T 5/00*     (2006.01)
    *H04N 19/46*     (2014.01)
    *H04N 19/44*     (2014.01)
    *H04N 19/467*     (2014.01)
    *H04N 19/423*     (2014.01)
    *H04N 19/85*     (2014.01)

(52) U.S. Cl.
    CPC ........... *H04N 5/775* (2013.01); *H04N 9/8715* (2013.01); *H04N 19/423* (2014.11); *H04N 19/44* (2014.11); *H04N 19/46* (2014.11); *H04N 19/467* (2014.11); *H04N 19/85* (2014.11); *G06T 2207/10016* (2013.01); *G06T 2207/20204* (2013.01)

(58) Field of Classification Search
    CPC . G06T 5/10; G06T 11/00; G06T 2207/20021; H04N 19/46; H04N 19/85; H04N 19/467; H04N 19/423; H04N 19/44; H04N 19/00484; H04N 19/00533; H04N 19/00545; H04N 19/00557; H04N 19/00903; H04N 19/117; H04N 19/136; H04N 19/176; H04N 1/32251; H04N 1/32309; H04N 2201/3205; H04N 2201/3214; H04N 2201/3215; H04N 2201/323; H04N 2201/3236; H04N 2201/3239; H04N 5/262
    See application file for complete search history.

(56) References Cited

U.S. PATENT DOCUMENTS

| | | | |
|---|---|---|---|
| 4,935,816 A | 6/1990 | Faber | |
| 5,028,280 A | 7/1991 | Ihara et al. | |
| 5,140,414 A | 8/1992 | Mowry | |
| 5,262,248 A | 11/1993 | Ihara et al. | |
| 5,335,013 A | 8/1994 | Faber | |
| 5,374,954 A | 12/1994 | Mowry | |
| 5,406,326 A | 4/1995 | Mowry | |
| 5,457,491 A | 10/1995 | Mowry | |
| 5,471,572 A | 11/1995 | Buchner et al. | |
| 5,475,425 A | 12/1995 | Przyborski et al. | |
| 5,629,769 A | 5/1997 | Cookingham et al. | |
| 5,641,596 A | 6/1997 | Gray et al. | |
| 5,659,382 A | 8/1997 | Rybczynski | |
| 5,687,011 A | 11/1997 | Mowry | |
| 5,706,361 A | 1/1998 | Kent et al. | |
| 5,706,380 A | 1/1998 | Kent et al. | |
| 5,709,972 A | 1/1998 | Cookingham et al. | |
| 5,767,860 A | 6/1998 | Zimmer et al. | |
| 5,781,664 A | 7/1998 | Bheda et al. | |
| 5,805,782 A | 9/1998 | Foran | |
| 5,817,447 A | 10/1998 | Yip | |
| 5,831,673 A | 11/1998 | Przyborski et al. | |
| 6,233,647 B1 | 5/2001 | Bentz et al. | |
| 6,441,918 B1 | 8/2002 | Hori | |
| 6,559,849 B1 | 5/2003 | Anderson et al. | |
| 6,650,327 B1 | 11/2003 | Airey et al. | |
| 6,665,369 B2 | 12/2003 | Ukita et al. | |
| 6,683,979 B1 | 1/2004 | Walker et al. | |
| 6,987,586 B2 | 1/2006 | Bogdanowicz et al. | |
| 7,065,255 B2 | 6/2006 | Chen et al. | |
| 7,366,242 B2 | 4/2008 | Demos | |
| 9,117,260 B2* | 8/2015 | Cooper | H04N 19/46 |
| 2002/0034337 A1 | 3/2002 | Shekter | |
| 2002/0154140 A1 | 10/2002 | Tazaki | |
| 2003/0218610 A1 | 11/2003 | Mech et al. | |
| 2004/0114055 A1 | 6/2004 | Yu | |
| 2004/0151389 A1 | 8/2004 | Itagaki et al. | |
| 2005/0200499 A1 | 9/2005 | Di Peppe | |
| 2006/0256853 A1* | 11/2006 | Schlockermann | H04N 19/50 375/240.03 |
| 2006/0291557 A1 | 12/2006 | Tourapis | |
| 2008/0232811 A1 | 9/2008 | Milner et al. | |

FOREIGN PATENT DOCUMENTS

| | | |
|---|---|---|
| EP | 0430504 | 6/1991 |
| EP | 0575006 | 10/1999 |
| EP | 0622000 | 3/2000 |
| EP | 1156679 | 11/2001 |
| EP | 1175091 | 1/2002 |
| EP | 1215624 | 6/2002 |
| EP | 1511320 | 3/2005 |
| EP | 1662802 | 5/2006 |
| EP | 1947621 | 7/2008 |
| JP | 04349458 | 12/1992 |
| JP | 05328134 | 12/1993 |
| JP | 7322245 | 12/1995 |
| JP | 08079765 | 3/1996 |
| JP | 9508507 | 8/1997 |
| JP | 11085955 | 3/1999 |
| JP | 2002374541 | 12/2002 |
| JP | 2003324326 | 1/2003 |
| JP | 2003274413 | 9/2003 |
| JP | 2005080301 | 3/2005 |
| KR | 1020040051370 | 6/2004 |
| RU | 2139637 | 10/1999 |
| WO | WO9314591 | 7/1993 |
| WO | WO9520292 | 7/1995 |
| WO | WO9722204 | 6/1997 |
| WO | WO0146992 | 6/2001 |
| WO | WO0177871 | 10/2001 |
| WO | WO0233958 | 4/2002 |
| WO | WO03005731 | 1/2003 |
| WO | WO2004104931 | 12/2004 |
| WO | WO2004105250 | 12/2004 |
| WO | WO2005027045 | 3/2005 |

OTHER PUBLICATIONS

Yoshida, "Go with the Grain, Film R&D Chief Urges, for Art's Sake", EETimes, Feb. 7, 2005, http://www.eetimes.com/showArticle.jhtml?articleID=59301182 (last checked Jul. 23, 2007), pp. 1-4.

Yan et al., "Efficient Video Coding with Hybrid Spatial and Fine Grain SNR Scalabilities", Proceedings of SPIE, vol. 4671, pp. 850-859, 2002.

Shahnaz et al., "Image Compression in Signal-Dependent Noise", Applied Optics, vol. 38, No. 26, Sep. 10, 1999, pp. 5560-5567.

Al-Shaykh et al., "Lossy Compression of Images Corrupted by Film Grain Noise", Proceedings of International Conference on Image Processing, Sep. 16-19, 1996, Lausanne, Switzerland, vol. I of III, IEEE 1996, pp. 805-808.

Al-Shaykh et al., "Lossy Compression of Noisy Images", IEEE Transactions on image Processing, vol. 7, No. 12, Dec. 1998, pp. 1641-1652.

Al-Shaykh et al., "Restoration of Lossy Compressed Noisy Images", IEEE Transactions of Image Processing, vol. 8., No. 10, pp.1348-1360, Oct. 1999.

Brightwell et al., "Automated Correction of Film Unsteadiness, Dirt and Grain", International Broadcasting Convention, Sep. 16-20, 1994 Conference Publication, No. 397, pp. 667-672.

Chavel et al., "Film Grain Noise in Partially Coherent Imaging", Optical Engineering, vol. 19, No. 3, May/Jun. 1980, pp. 404-410.

Fischer et al., "Image Sharpening Using Permutation Weighted Medians", Dept of Electrical Engineering, University of Delware, Newark, DE, Sep. 2000, pp. 1-4.

McLean et al., "Telecine Noise Reduction", IEE Seminar Digital Restoration of Film and Video Archives, (Ref. No. 01/049), London, UK. Jan. 16, 2001, pp. 2/1-2/6.

(56) References Cited

OTHER PUBLICATIONS

Yan et al., "Film Grain Noise Removal and Generation for Color Images", 1997 IEEE Signal Processing Workshop on Higher-Order Statistics, Jul. 21-23, Banff, Alberta, Canada. pp. 73-76.
Yan et al., "Signal-Dependent Film Grain Noise Removal and Generation Based on Higher-Order Statistics", 1997 IEEE Signal Processing Workshop on Higher-Order Statistics, Jul. 21-23, Banff, Alberta, Canada, pp. 77-81.
Zhang et al., "Constant Quality Constrained Rate Allocation for FGS Video Coded Bitstreams", Proceedings of SPIE, vol. 4671, pp. 817-827, 2002.
Zhao, "Constant Quality Rate Control for Streaming MPEG-4 FGS Video", IEEE, 2002, pp. 544-547.
Van Der Schaar et al., "Fine-Granularity-Scalability for Wireless Video and Scalable Storage", Proceedings of SPIE, vol. 4671, pp. 805-816, 2002.
Oktem et al., "Transform Domain Algorithm for Reducing Effect of Film-Grain Noise in Image Compression", Electronics Letters, vol. 35, No. 21, Oct. 14, 1999, pp. 1830-1831.
Peng et al., "Adaptive Frequency Weighting for Fine-Granularity-Scalability", Proceedings of SPIE, vol. 4671, pp. 840-849, 2002.
Prades-Nebot et al., "Rate Control for Fully Fine Grained Scalable Video Coders", Proceedings of SPIE, vol. 4671, pp. 828-839, 2002.
Schlockerman et al: "Film Grain Coding in H.264/AVC". JVT of ISO/IEC ITU-T MOEG & ITU-T VCEG (ISO/IEC JTC/SC29/WC11 and ITU-T SG16 Q6), Sep. 6, 2006, pp. 1-8.
Gomila: "SEI Message for Film Grain Encoding"; JVT of ISO/IEC ITU-T VCEG, May 2003, pp. 1-14, Geneva.

\* cited by examiner

Computation of 8x8 block averages during display process

Computation of 8x8 block averages during decoding

APPARATUS AND SYSTEM FOR DETERMINING BLOCK AVERAGES FOR FILM GRAIN SIMULATION

CROSS-REFERENCE TO RELATED APPLICATIONS

This application claims priority to U.S. Provisional Patent Application Ser. No. 60/619,632, filed Oct. 18, 2004, and is a Continuation of U.S. patent application Ser. No. 11/252,320 which are herein incorporated by reference in their entireties.

FIELD OF THE INVENTION

The present invention generally relates to film grain simulation and, more particularly, to apparatuses and systems for determining block averages in film grain simulation.

BACKGROUND OF THE INVENTION

Film grain forms in motion picture images during the process of development. Film grain is clearly noticeable in HD images and becomes a distinctive cinema trait that is becoming more desirable to preserve through the whole image processing and delivery chain. Nevertheless, film grain preservation is a challenge for current encoders since compression gains related to temporal prediction cannot be exploited. Because of the random nature of the grain, visually lossless encoding is only achieved at very high bit-rates. Lossy encoders tend to suppress the film grain when filtering the high frequencies typically associated with noise and fine textures.

In the recently created H.264 I MPEG-4 AVC video compression standard, and in particular in its Fidelity Range Extensions (FRExt) Amendment 1 (JVT-K051, ITU-T Recommendation H.264 I ISO/IEC 14496-10 International Standard with Amendment 1, Redmond, USA, June 2004), a film grain Supplemental Enhancement Information (SEI) message has been defined. Such a message describes the film grain characteristics regarding attributes like size and intensity, and allows a video decoder to simulate the film grain look onto a decoded picture. The H.264 I MPEG-4 AVC standard specifies which parameters are present in the film grain SEI message, how to interpret them and the syntax to be used to encode the SEI message in binary format. The standard does not specify, however, the exact procedure to simulate film grain upon reception of the film grain SEI message.

Film grain simulation is a relatively new technology used in post-production to simulate film grain on computer-generated material, as well as during restoration of old film stocks. For this kind of applications, there exists commercial software in the market like Cineon®, from Eastman Kodak Co, Rochester, N.Y., and Grain Surgery™, from Visual Infinity. These tools require user interaction and are complex to implement, which makes them unsuitable for real-time video coding applications. Furthermore, none of these tools has the capability to interpret a film grain SEI message as specified by the H.264/AVC video coding standard or the like.

SUMMARY OF THE INVENTION

The present invention advantageously provides apparatuses and systems for determining block averages in film grain simulation.

In one embodiment of the present invention, an apparatus for determining block averages in film grain simulation includes a memory storing at least one of control programs, algorithms and film grain patterns and a processor for executing the program routines. In such an embodiment, the apparatus configured to determine a block average for said decoded picture in a display pipeline, avoiding external memory usage for the block average and select at least one film grain pattern for combination with said decoded picture, wherein the selecting is based, at least in part, on the determined block average.

In an alternate embodiment of the present invention, an apparatus for determining block averages in film grain simulation includes a memory storing at least one of control programs, algorithms and film grain patterns and a processor for executing the program routines. In such an embodiment, the apparatus configured to determine a block average for the decoded picture during a decode process, store the determined block average in an external memory and select at least one film grain pattern for combination with the decoded picture, wherein the selecting is based, at least in part, on the determined block average.

BRIEF DESCRIPTION OF THE DRAWINGS

The teachings of the present invention can be readily understood by considering the following detailed description in conjunction with the accompanying drawings, in which.

Figure 1:
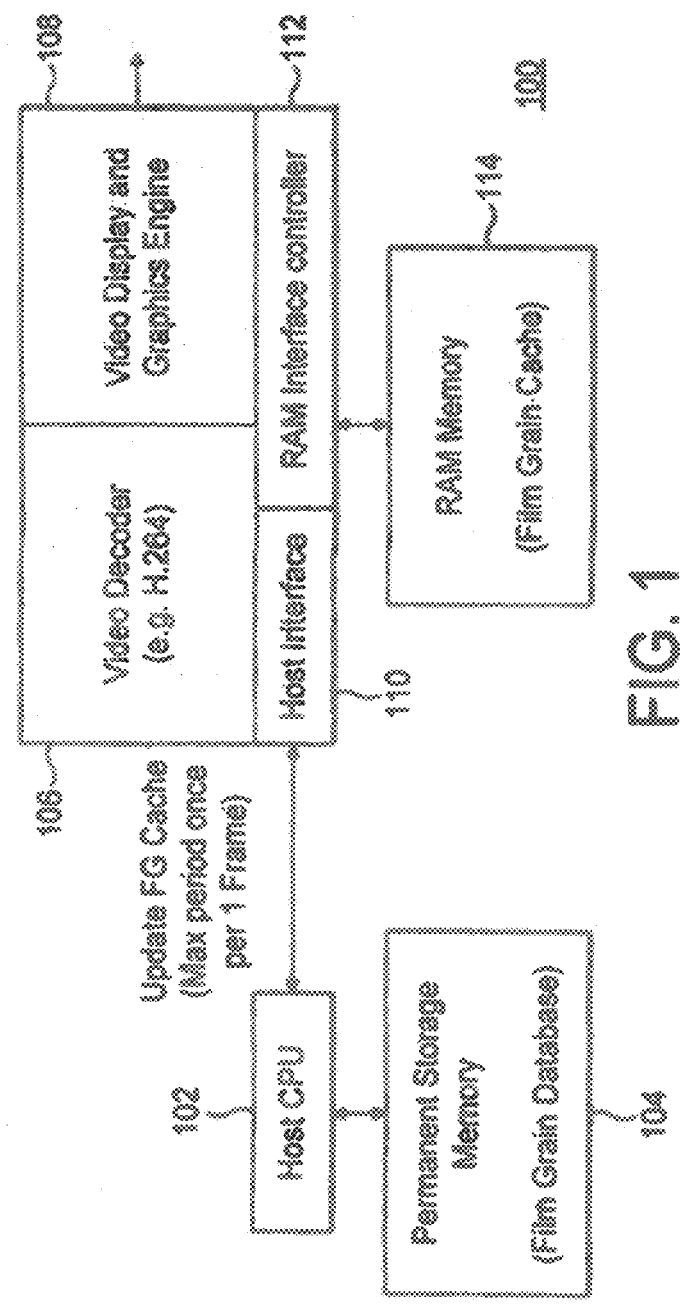
FIG. 1 depicts a high level block diagram of a video decoder subsystem having film grain simulation capabilities in accordance with one embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides methods for determining block averages in film grain simulation. Although the present invention will be described primarily within the context of a video decoder subsystem for application in, for example, IC designs for consumer HD DVD players, the specific embodiments of the present invention should not be treated as limiting the scope of the invention. It will be appreciated by those skilled in the art and informed by the teachings of the present invention that the concepts of the present invention can be advantageously applied in any film grain simulation processes in, for example, media player/receiver devices, decoders, set-top boxes, television sets or the like.

FIG. 1 depicts a high level block diagram of a video decoder subsystem having film grain simulation capabilities in accordance with one embodiment of the present invention. The video decoder subsystem 100 of FIG. 1 illustratively comprises a video decoder (illustratively a H.264 decoder) 106, a video display and graphics engine 108, a host interface 110, an interface controller (illustratively a RAM interface controller) 112, and a local memory (illustratively a RAM memory) 114 implemented as a film grain cache for storing a small subset of the film grain patterns in the remote film grain database 104. FIG. 1 further depicts a host CPU 102 and a remote permanent storage program memory comprising a remote film grain database 104. Although in the video decoder subsystem 100 of FIG. 1, the host CPU 102 and the remote film grain database 104 are depicted as comprising separate components, in alternate embodiments of the present invention, the remote film grain database 104 can be located in a permanent memory of the CPU 102. Furthermore, although in the video decoder subsystem 100 of FIG. 1, the video decoder 106, the video display and graphics engine 108, the host interface 100, and the interface controller 112 are depicted as comprising separate components, in alternate embodiments of the present invention, the video decoder 106, the video display and graphics engine 108, the host interface 100, and the interface controller 112 can comprise a single component and can be integrated in a single integrated system-on-chip (SoC) design.

Furthermore, although in the video decoder subsystem 100 of FIG. 1, the means for storing the film grain patterns are depicted as a local memory 114 (cache) and a remote film grain database 104, in alternate embodiments of the present invention, substantially any accessible storage means may be implemented to maintain a subset of the film grain patterns and the total number of film grain patterns. Such means may include storage disks, magnetic storage media, optical storage media or substantially any storage means. In addition, one or more storage means may be implemented for each of the storage devices. Even further, although the film grain database 104 of FIG. 1 is depicted as being located remotely from the memory 114, in alternate embodiments of the present invention, the film grain patterns storage means may be located in close proximity or at great distances from each other.

Figure 2:
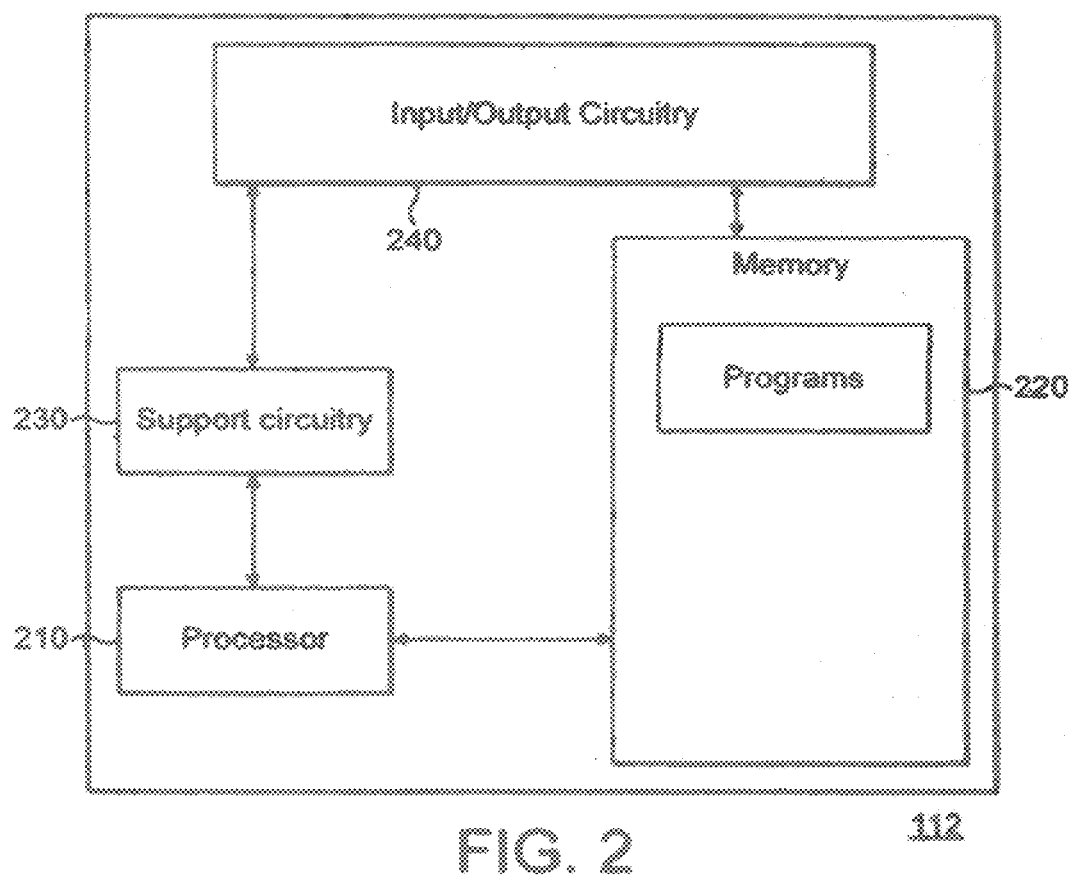
FIG. 2 depicts a high level block diagram of an embodiment of an interface controller suitable for use in the video decoder subsystem of FIG. 1.

FIG. 2 depicts a high level block diagram of an embodiment of an interface controller suitable for use in the video decoder subsystem 100 of FIG. 1. The interface controller 112 of FIG. 2 comprises a processor 210 as well as a memory 220 for storing control programs, algorithms and the like. The processor 210 cooperates with conventional support circuitry 230 such as power supplies, clock circuits, cache memory and the like as well as circuits that assist in executing the software routines stored in the memory 220. As such, it is contemplated that some of the process steps discussed herein as software processes may be implemented within hardware, for example, as circuitry that cooperates with the processor 210 to perform various steps. The interface controller 112 also contains input-output circuitry 240 that forms an interlace between the various respective functional elements communicating with the interface controller 112.

Although the interface controller 112 of FIG. 2 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

Referring back to the subsystem 100 of FIG. 1, the remote film grain database 104 is typically relatively large. In one embodiment of the present invention, the H.264 video decoder 106, the video display and graphics engine 108, the host interface 110, the interface controller 112, and the local memory 114 comprise components of an HD DVD player. Film grain patterns from the remote film grain database 104 are needed to be accessed at the sample rate of, for example, the HD DVD player. Therefore, fast access to the large film grain database 104 is necessary. In the subsystem 100 of FIG. 1 in accordance with the present invention, only a small portion of the remote film grain database 104 is used during Supplemental Enhancement Information (SEI) film grain periods, which are leveraged to develop a caching technique to reduce complexity.

More specifically, the film grain simulation process of FIG. 1 requires the decoding of film grain SEI messages, conveyed in the International Standard ITU-T Rec. H.264 I ISO/IEC 14496-10 bit-streams as specified by Amendment 1 (Fidelity Range Extensions), which are both herein included by reference in their entireties. In one embodiment of the present invention, film grain SEI messages are sent preceding I (intra-coded) pictures, and only one film grain SEI message precedes a particular I picture.

Figure 3:
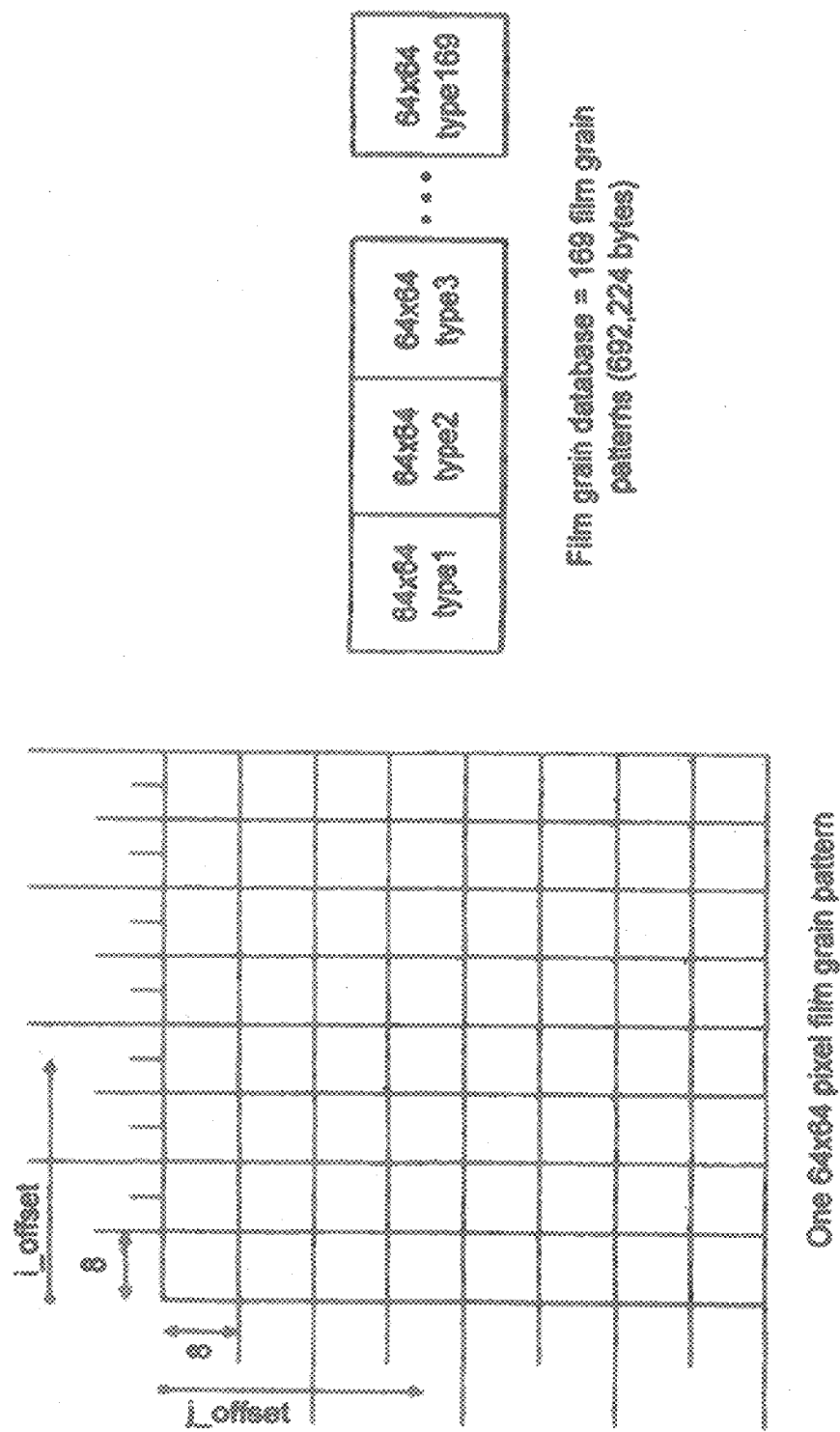
FIG. 3 depicts a high level block diagram of a typical arrangement of the film grain database of FIG. 1.

In one embodiment of the present invention, the remote film grain database 104 of film grain patterns is composed of 169 patterns of 4,096 film grain samples, each representing a 64×64 film grain image. For example, FIG. 3 depicts a high level block diagram of a typical arrangement of the film grain database of FIG. 1. FIG. 3 depicts a 64×64 sample film grain pattern with i_offset in the x-axis and j_offset in the y-axis. FIG. 3 further depicts the 169 film grain patterns of the various types.

In the film grain database 104, each film grain pattern is synthesized using a different pair of cut frequencies according to a frequency filtering model of the standard specifications. The cut frequencies transmitted in the SEI message are used to access the remote film grain database 104 of film grain patterns during the film grain simulation process. The film grain database 104 is stored in ROM, Flash, or other permanent storage device, such as the film grain database 104 of the video decoder subsystem 100 of FIG. 1, and typically does not change. The film grain database 104 contains random film grain patterns in a very large variety of film grain shapes and sizes. However, for a specific video content sequence only a small subset of this database is actually needed to effectively simulate film grain. The specification limits the number of film grain patterns to a small subset for any SEI message period. Therefore, the present invention implements a small film grain cache, such as the local memory 114, which is updated on receipt of SEI messages.

Typically, the remote film grain database 104 is stored in the permanent storage of the host CPU 102 or at the site of the host CPU 102. However, it is the video decoder 106 and the video display and graphics engine 108 that need fast access to the film grain database 104. As such, and in accordance with the present invention, the local memory 114 is provided for fast access to at least a subset of the film grain patterns. That is, at least a small subset of the film grain patterns needed or most implemented by the existing SEI message period is transferred to and stored in the local memory 114.

In one embodiment of the present invention, the local memory 114 is large enough to store the entire film grain database 104. In such an embodiment, the video decoder 106 and the video display and graphics engine 108 have immediate and fast access, via the controller 112, to all of the available film grain patterns originally stored in the remote film grain database 104. In addition, such an embodiment of the present invention has the advantage that the film grain cache in the local memory 114 does not have to be updated on receipt of an SEI message. Such an embodiment, however, has the disadvantage that more memory (e.g., RAM) is required. In some implementations, however, such large memory space (e.g., RAM) is already available.

In an alternate embodiment of the present invention, the local memory 114 is only large enough to store a subset of the film grain database 104. In such an embodiment, on each receipt of an SEI message, the controller 112 initiates an examination of the cache of the local memory 114 to determine if any of the subset of film grain patterns already in the local memory 114 needs to be replaced with different film grain patterns in the remote film grain database 104 selected in the new SEI message. An advantage of this technique is a smaller local memory 114 allocation. A disadvantage is that the cache of the local memory 114 must be managed by the controller 112, and in the worst case, a full cache size must be transferred from the remote film grain database 104 to the local memory 114 for each I frame via, for example, the controller 112. In addition, in such an embodiment of the present invention, on device boot up (or reset), the local memory 114 (i.e., the film grain cache) can be pre-initialized by the controller 112 with the most common film grain patterns stored in the remote film grain database 104. That is, the selection of which film grain patterns to store in the local memory 114 depends on empirical data based on what film grain patterns in the film grain database 104 were most often used across a wide selection of film content.

In any event, in the above described embodiments of the present invention, the local memory 114 in accordance with the present invention, in conjunction with the controller 112, enable the video decoder 106 and the video display and graphics engine 108 faster access to the film grain patterns previously only contained in the remote film grain database 104.

Referring back to FIG. 1, in film grain simulation systems, such as the video decoder subsystem 100 of FIG. 1, the block average (e.g., 8×8 block average) of a decoded picture is required to define the film grain shape, size, and intensity. Therefore, in the video decoder subsystem 100 of FIG. 1, before accessing the local memory 114 to search for or to select a film grain pattern, the block average needs to be calculated. More specifically, the block average of a decoded picture is a set of values, each one representing the average value of the samples of each one of the blocks that made the picture. For example, if our decoded picture is 32 samples wide and 24 samples high, and the blocks are 8 samples wide and 8 samples high, the block average of the decoded picture can be represented in a matrix form as follows:

$$\text{Block\_average} = \begin{matrix} Avg1 & Avg2 & Avg3 & Avg4 \\ Avg5 & Avg6 & Avg7 & Avg8 \\ Avg9 & Avg10 & Avg11 & Avg12 \end{matrix}$$

where Avg1 is the average value of the samples in block 1, which has its top-left sample at coordinate (0,0) and its bottom-right sample at coordinate (7,7), Avg2 is the average of the samples in block 2, which has its top-left sample at coordinates (8,0), and its bottom-right sample at coordinates (15,7), etc.

In addition, the block average can be computed for each color component separately. For example, if the decoded picture is a color image in the YUV color space (Y with luminance information, U and V with chrominance information), it is possible to compute three block averages for the picture, one per color component. If the sample at coordinates (x,y) for color component c are denoted by decoded_picture[c][x][y], the block average of a block N samples wide and M samples high which top-left sample is at coordinate (Ox, Oy) could be computed as follows:

```
average = 0
for (i = Ox, i < Ox + N; i++)
    for (j = Oy, j < Oy + M; j++)
        average += decoded_picture[c][i][j]
    endfor
endfor
average /= N * M.
```

The previous pseudo-code essentially initializes the block average to 0, then adds to it the value of all the samples in the block and finally divides the resulting value by the number of samples, to obtain the average. This process should be repeated for all three color components.

In the case of film grain simulation, where the film grain parameters change on a block basis, the block average of each block (i.e., the average value of the samples of the block) is used to select the appropriate film grain parameters for the block. In accordance with the present invention, the inventors propose herein two options for determining the block average of a decoded picture.

In a first embodiment of the present invention, the block average of a decoded picture is determined during the display process. In some implementations, a decoder may already read decoded picture blocks (e.g., 8×8 blocks) from external memory (e.g., RAM) during the display process. In this case and in accordance with the present invention, the block average (e.g., 8×8 block average) is performed in the display pipeline. In accordance with the present invention, it is possible to compute the block average (e.g., 8×8 block average) during the display process even if pixels are read in raster-scan order (i.e. left to right, top to bottom). For example, FIG. 4 depicts a flow diagram of a method for the computation of block averages during the decoding process while reading pixels in raster-scan order in accordance with one embodiment of the present invention.

Figure 4:
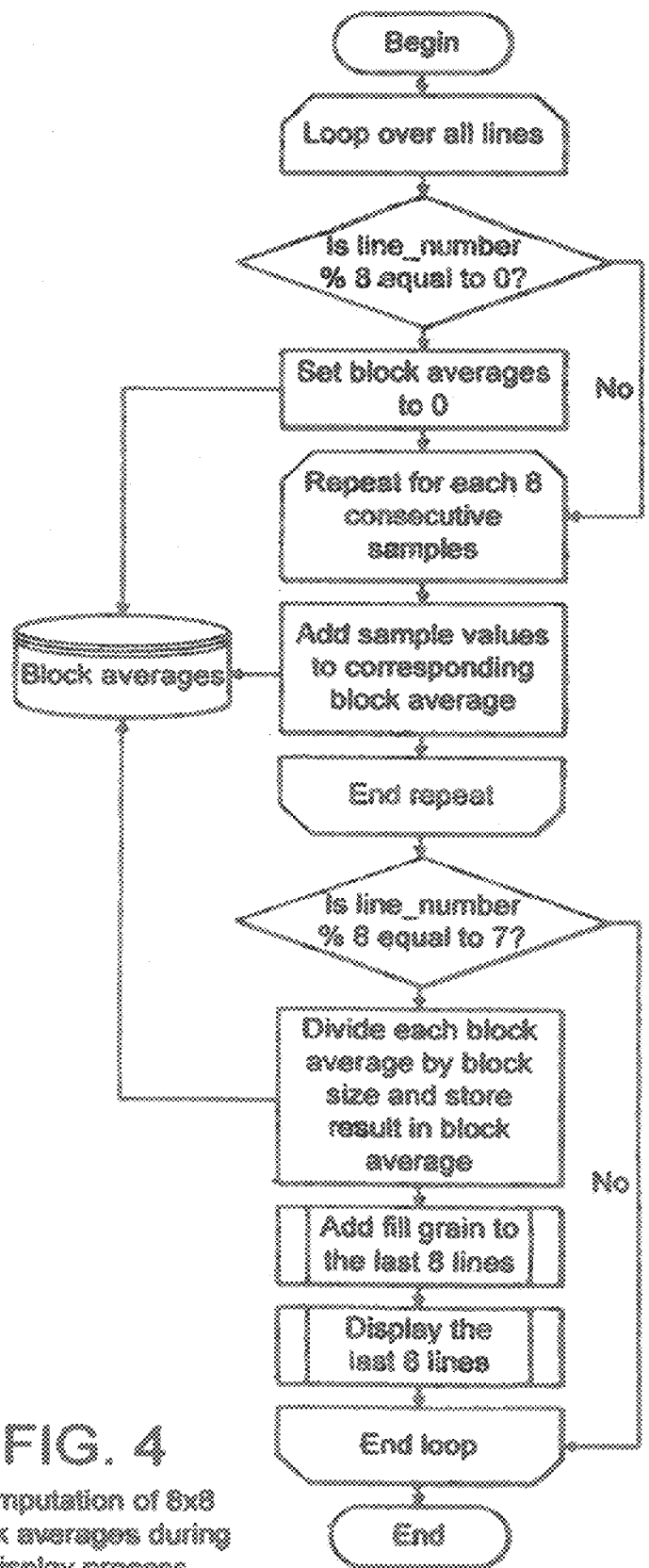
FIG. 4 depicts a flow diagram of a method for the computation of block averages during the display process in accordance with one embodiment of the present invention.

In the method 400 of FIG. 4, an image is processed in groups of 8 lines, and the block average for all 8×8 blocks in the group of 8 lines is computed in parallel. The method 400 begins by setting the block averages to 0 for the first line in the group. The line is then processed in groups of 8 samples. The first 8 samples are added to the first block average (which corresponds to the first 8×8 block in the group of 8 lines), the second 8 samples are added to the second block, average (which corresponds to the second 8×8 block) and so on. The seven remaining lines are processed in the same way by reusing the same block averages. That is, the first 8 samples in lines 2 to 7 are added to the first block average, the second 8 samples are added to the second block average, and so on. At the end of the seventh line, each block average contains the summation of all the samples of the block. In order to obtain the average value, the summation is divided by the number of samples in the block (64 in this case). Once the block average for all 8×8 blocks of the group of 8 lines is known, film grain can be added to them and the lines are ready to be sent to the display. By decoupling the computation of the block average from the decoding process, this approach allows the use of any decoder (since no changes are required to it). At the same time, by reading pixels in raster-scan order during the display process, efficient memory access techniques can be used, leading to a reduced overhead.

Figure 5:
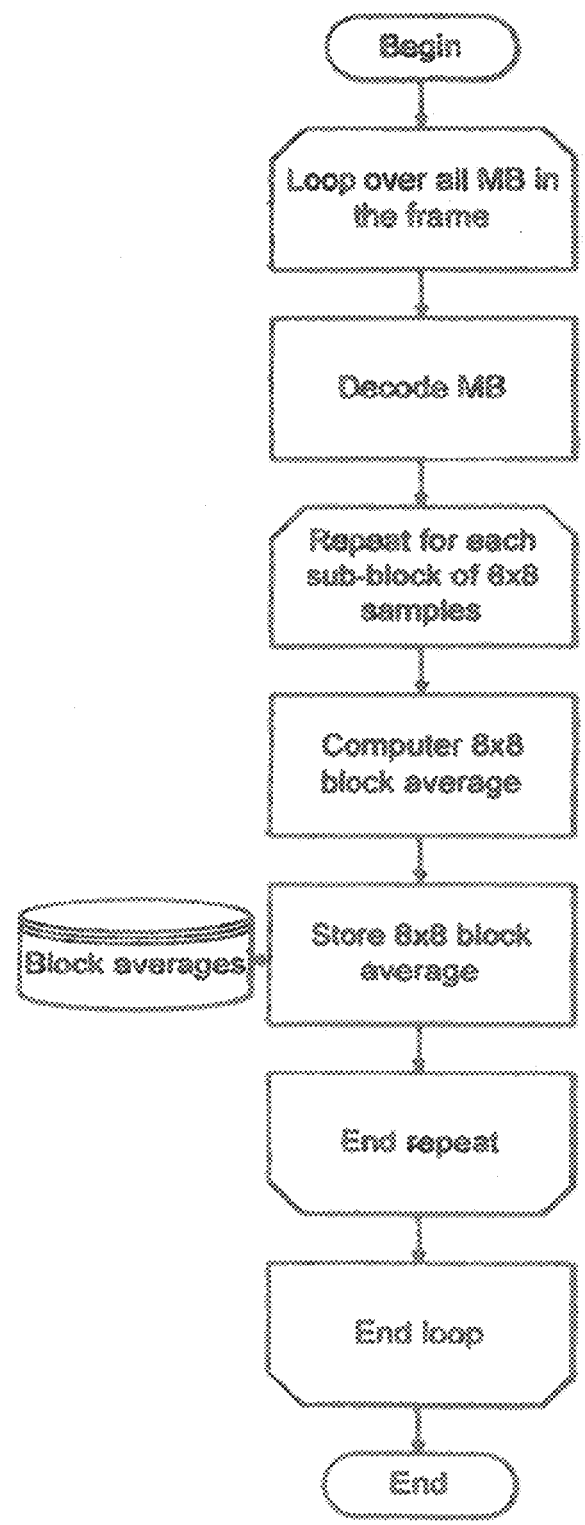
FIG. 5 depicts a flow diagram of a method for the computation of block averages during the decode process in accordance with one embodiment of the present invention.

In a second embodiment of the present invention, the block average of a decoded picture is determined during a video decode process (i.e., during the H.264 decode process). During the video compression decode operation the 8×8 block samples are available. For example, FIG. 5 depicts a flow diagram of a method for the computation of block averages during the decode process in accordance with one embodiment of the present invention. The method 500 of FIG. 5 illustrates the combining the decoding of a video frame with the computation of the block average of each block (e.g., 8×8 block). The method 500 of FIG. 5 begins by decoding a macro-block of samples (i.e., most video coding standards, such as MPEG-2 and H.264 / MPEG-4 AVC, use 16×16 macroblocks). Next, the block average of each sub-block (e.g., 8×8 sub-block) is computed and stored into memory. This approach minimizes the amount of data that has to be read from memory because the values required to compute the block average are readily available during the decoding process, reducing the requirements on memory bandwidth.

These block averages are then stored in an external memory (e.g., RAM), such as the local memory 114 of FIG. 1 or a separately provided memory (e.g., RAM), to be accessed during a film grain simulation of the display process. This method of the present invention requires some external storage for each decoded frame before it is displayed. In the worst case scenario, this embodiment requires 146 Kbytes of external memory (e.g., RAM) to store the 8×8 block average values of three decoded frames. In addition, some minimal extra memory bandwidth is required to store and retrieve the block averages (e.g., 8×8 block averages).

The two methods for determining block averages in accordance with the embodiments of the present invention described above trade off external memory (e.g., RAM) storage with memory bandwidth. The first method uses no external memory, but requires either extra reads of the 8×8 blocks, or internal memory in the display pipeline. The second method requires a little extra memory bandwidth, and 146 Kbytes of external memory (e.g., RAM).

Having described various embodiments for methods, apparatus and systems for film grain simulation (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof. As such, the appropriate scope of the invention is to be determined according to the claims, which follow.

The invention claimed is:

1. An apparatus for determining block averages of a decoded picture in a film grain simulation process, comprising:
   a memory storing at least one of control programs, algorithms and film grain patterns each with a program routine; and
   a processor for executing said program routines;
   said apparatus configured to:
   determine a block average for said decoded picture in a display pipeline, avoiding external memory usage for said block average; and
   select at least one film grain pattern for combination with said decoded picture, wherein the selecting is based, at least in part, on said determined block average.

2. The apparatus of claim 1, wherein said apparatus comprises an interface controller.

3. The apparatus of claim 1, wherein said apparatus is configured to:
   compute the block average for one block at a time.

4. The apparatus of claim 1, wherein said apparatus is configured to:
   compute the block average for all the blocks in a row in parallel.

5. The apparatus of claim 1 wherein said apparatus is configured to:
   reuse the pixel values used to compute the block average for the film grain simulation process; and,
   reuse the pixel values used for the film grain simulation process for a display process.

6. An apparatus for determining block averages of a decoded picture in a film grain simulation process, comprising:
   a memory storing at least one of control programs, algorithms and film grain patterns each with a program routine; and
   a processor for executing said program routines; said apparatus configured to:
   determine a block average for said decoded picture during a decode process;
   store said determined block average in an external memory; and
   select at least one film grain pattern for combination with said decoded picture, wherein the selecting is based, at least in part, on said determined block average.

7. The apparatus of claim 6 wherein said apparatus is configured to:
   decode a set of pixels; and
   compute the block average using the set of decoded pixels.

8. The apparatus of claim 7 wherein the decoded set of pixels is a macro-block.

9. The apparatus of claim 8 wherein the macroblock contains 16×16 samples, and 4 block averages are computed for each sample, one per each non-overlapping 8×8 block of said each sample.

10. A system for determining block averages of a decoded picture in a film grain simulation process, comprising:
    a video decoder decoding pictures;
    a video display and graphics engine displaying pictures; and
    an interface controller in communication with said video decoder and said video display and graphics engine, the interface controller comprising a memory storing at least one of control programs, algorithms and film grain patterns each with a program routine; and
    a processor executing said program routines;

said interface controller configured to:
determine a block average for said decoded picture in a display pipeline, avoiding external memory usage for said block average; and
select at least one film grain pattern for combination with said decoded picture, wherein the selecting is based, at least in part, on said determined block average.

11. The system of claim 10, comprising a permanent memory for storing film grain patterns.

12. The system of claim 11, wherein said selected at least one film grain pattern is obtained from said permanent memory.

13. The system of claim 10 wherein said apparatus is configured to:
decode a set of pixels; and
compute the block average using the set of decoded pixels.

14. The system of claim 13 wherein the decoded set of pixels is a macro-block.

15. The system of claim 14 wherein the macroblock contains 16×16 samples, and 4 block averages are computed for each sample, one per each non-overlapping 8×8 block of said each sample.

16. A system for determining block averages of a decoded picture in a film grain simulation process, comprising:
a video decoder decoding pictures;
a video display and graphics engine displaying pictures; and
an interface controller in communication with said video decoder and said video display and graphics engine, the interface controller comprising a memory storing at least one of control programs, algorithms and film grain patterns each with a program routine: and
a processor executing said program routines;
said interface controller configured to:
determine a block average for said decoded picture during a decode process;
store said determined block average in an external memory; and
select at least one film grain pattern for combination with said decoded picture, wherein the selecting is based, at least in part, on said determined block average.

17. The system of claim 16 wherein said apparatus is configured to:
decode a set of pixels; and
compute the block average using the set of decoded pixels.

18. The system of claim 17 wherein the decoded set of pixels is a macro-block.

19. The system of claim 18 wherein the macroblock contains 16×16 samples, and 4 block averages are computed for each sample, one per each non-overlapping 8×8 block of said each sample.

20. The system of claim 16, comprising a permanent memory for storing film grain patterns and wherein said selected at least one film grain pattern is obtained from said permanent memory.

* * * * *